(12) United States Patent
Green et al.

(10) Patent No.: US 11,041,803 B2
(45) Date of Patent: Jun. 22, 2021

(54) FEED-FORWARD SPECTRAL CALIBRATION METHODOLOGY FOR LINE-SCANNED TUNABLE LASER ABSORPTION SPECTROSCOPY

(71) Applicants: INTERNATIONAL BUSINESS MACHINES CORPORATION, Armonk, NY (US); TRUSTEES OF PRINCETON UNIVERSITY, Princeton, NJ (US)

(72) Inventors: William Green, Yorktown Heights, NY (US); Matthias Dittberner, Neustrelit (DE); Chi Xiong, Yorktown Heights, NY (US); Eric Zhang, Yorktown Heights, NY (US); Gerard Wysocki, Princeton, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 22 days.

(21) Appl. No.: 16/364,544

(22) Filed: Mar. 26, 2019

(65) Prior Publication Data

US 2020/0309690 A1    Oct. 1, 2020

(51) Int. Cl.
*G01N 21/25* (2006.01)
*G01N 21/39* (2006.01)

(52) U.S. Cl.
CPC .......... *G01N 21/39* (2013.01); *G01N 21/255* (2013.01); *G01N 2201/06113* (2013.01)

(58) Field of Classification Search
CPC ............. G01N 21/39; G01N 21/255; G01N 2201/06113

USPC ................. 356/436, 437, 323, 456
See application file for complete search history.

(56) References Cited

U.S. PATENT DOCUMENTS

| | | | | |
|---|---|---|---|---|
| 5,317,156 A | * | 5/1994 | Cooper ............... | G01N 21/39 |
| | | | | 250/339.13 |
| 5,572,031 A | * | 11/1996 | Cooper ............... | G01D 3/0365 |
| | | | | 250/343 |
| 6,351,309 B1 | * | 2/2002 | Bomse ............... | G01J 3/4338 |
| | | | | 250/343 |
| 9,983,056 B2 | * | 5/2018 | Froehlich ........... | G01J 3/0205 |
| 10,082,457 B2 | | 9/2018 | Green et al. | |

(Continued)

OTHER PUBLICATIONS

Chu C. Teng, et al., "Dynamic Optical Fringe Suppression for Silicon Photonic Sensors," Cleo: Science and Innovations 2018, San Jose, California United States, pp. 1-2, May 13-18, 2018.

(Continued)

*Primary Examiner* — Isiaka O Akanbi
(74) *Attorney, Agent, or Firm* — F. Chau & Associates, LLC

(57) ABSTRACT

A generalized feed-forward method for accurate tunable laser absorption spectroscopy includes generating a laser beam. The generated laser beam is directed down a reference path and a test/sample path. One or more parameters are extracted from the reference path. The one or more parameters, extracted from the reference path, are used as feed-forward, to adjust spectral analysis of the test/sample path to detect a composition and/or concentration of an analyte gas within the test/sample path. The extraction of the one or more parameters from the reference path and the spectral analysis of the test/sample path are performed substantially concurrently.

14 Claims, 4 Drawing Sheets

(56) References Cited

U.S. PATENT DOCUMENTS

| | | | | |
|---|---|---|---|---|
| 10,677,726 B2* | 6/2020 | Green | ............ | G01J 3/26 |
| 2005/0140979 A1* | 6/2005 | Kluczynski | ............ | G01N 21/39 |
| | | | | 356/425 |
| 2013/0265112 A1* | 10/2013 | Strabley | ............ | H03L 7/26 |
| | | | | 331/94.1 |
| 2014/0049777 A1* | 2/2014 | Sun | ............ | G01J 3/4338 |
| | | | | 356/409 |
| 2018/0328840 A1 | 11/2018 | Green et al. | | |

OTHER PUBLICATIONS

L. Tombez, et al., Methane Absorption Spectroscopy on a Silicon Photonic Chip, Optical Society of America, vol. 4, No. 11, Nov. 2017, pp. 1322-1325.

Peter Werle, et al., "Near and Mid-Infrared Laser-Optical Sensors for Gas Analysis," Optics and Lasers in Engineering 37, (2002) 101-114.

Jane Hodgkinson, et al., "Optical Gas Sensing: A Review," Measure Science Technology, 24, (2013) pp. 1-59.

Peter Werle, "A Review of Recent Advances in Semiconductor Laser Based Gas Monitors," Spectrochimica Acta Part 1 54 (1998) pp. 197-236.

Chu C. Teng, et al., "Fiber-Pigtailed Silicon Photonic Sensors for Methane Leak Detection," in Conference on Lasers and Electro-Optics (OSA, 2017) pp. 1-2.

* cited by examiner

FEED-FORWARD SPECTRAL CALIBRATION METHODOLOGY FOR LINE-SCANNED TUNABLE LASER ABSORPTION SPECTROSCOPY

GOVERNMENT LICENSE RIGHTS

This invention was made with government support under DE-AR0000540 awarded by the Department of Energy. The government has certain rights in the invention.

BACKGROUND

The present invention relates to laser absorption spectroscopy (LAS) and, more specifically, to a feed-forward spectral calibration methodology for an adaptable real-time data acquisition architecture utilized in line-scanned tunable laser absorption spectroscopy (TLAS).

Laser absorption spectroscopy (LAS) is the process of analyzing the atomic and/or molecular composition of matter by analyzing the frequency spectrum of laser light passing through an analyte. One common type of LAS is tunable laser spectroscopy (TLAS), where various manifestations including free-space and integrated on-chip spectroscopic sensors for performing TLAS have been developed in both mid-infrared and near-infrared spectral ranges.

However, such spectroscopic sensors, whether free-space, fiber-based, or integrated photonic chip manifestations are prone to a variety of drift and noise limitations during TLAS. Main examples of such limitations include laser wavelength calibration, both in the absolute and relative wavelength scaling, laser scan non-linearities, and detection system offsets.

SUMMARY

A generalized feed-forward method for accurate tunable laser absorption spectroscopy includes generating a laser beam. Hie generated laser beam is directed down a reference path and a test/sample path. One or more parameters are extracted from the reference path. The one or more parameters, extracted from the reference path, are used as feed-forward, to adjust spectral analysis of the test/sample path to detect a composition and/or concentration of an analyte gas within the test/sample path. The extraction of the one or more parameters from the reference path and the spectral analysis of the test/sample path are performed substantially concurrently.

A tunable laser absorption spectrometer includes a tunable laser configured to generate a laser beam in response to a ramping signal. A laser driver supplies the ramping signal to the tunable laser. A reference path is configured to acquire a reference spectrum from a reference gas, using the generated laser beam. A test/sample path is configured to acquire a test/sample spectrum from an analyte gas, using the generated laser beam. A spectral analyzer is configured to analyze a spectrum from the test/sample path light of feed-forward parameters extracted from the test/sample spectrum.

A computer program product for generalized feed-forward method for accurate tunable laser absorption spectroscopy includes a tangible computer readable storage medium having program instructions embodied therewith. The program instructions are executable by a computer to cause the computer to generate a laser beam, direct the generated laser beam down a reference path and a test/sample path, extract one or more parameters from the reference path, and use the one or more parameters, extracted from the reference path, as feed-forward, to adjust spectral analysis of the test/sample path to detect a composition and/or concentration of an analyte gas within the test/sample path. The extraction of the one or more parameters from the reference path and the spectral analysis of the test/sample path are performed substantially concurrently.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

Figure 1:
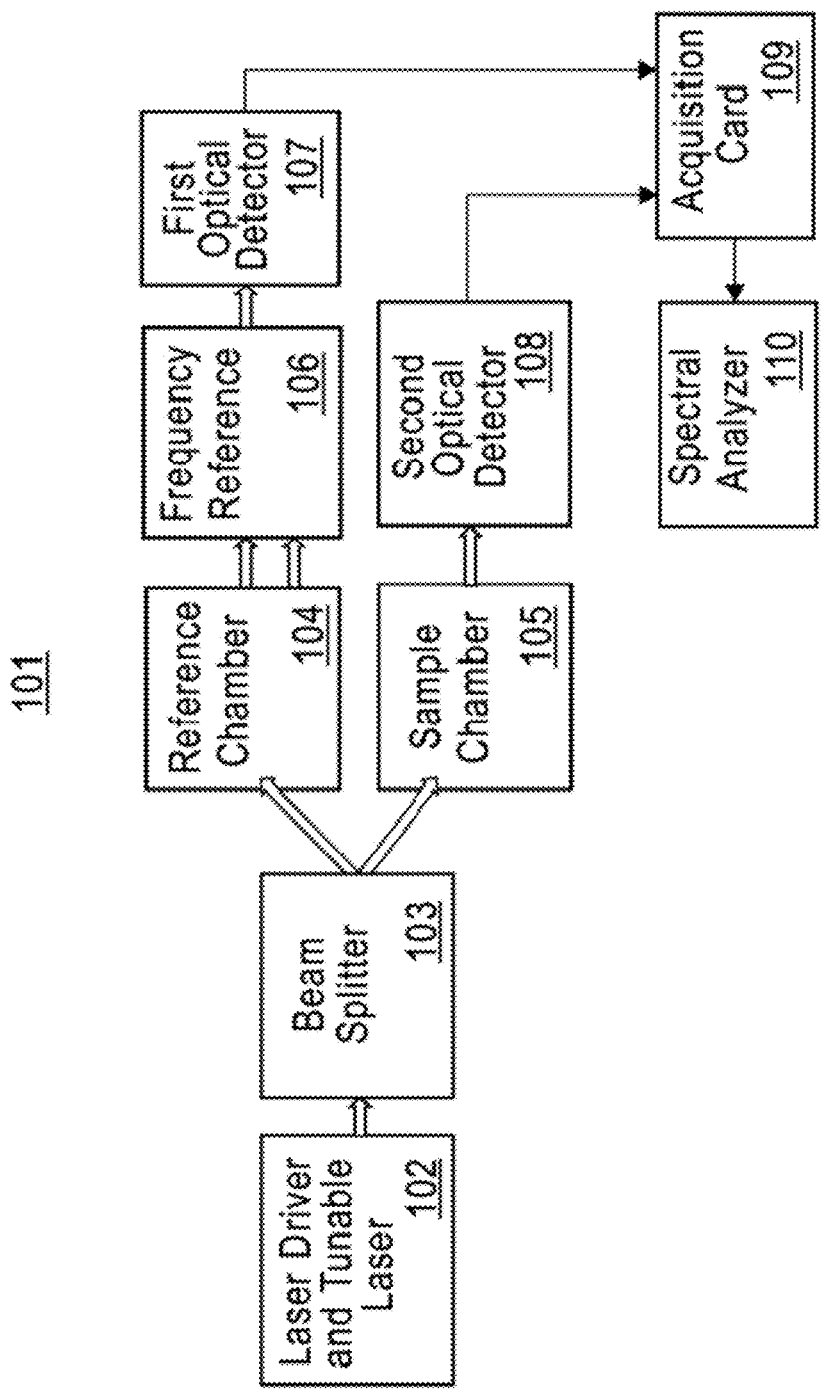
FIG. 1 is a schematic diagram illustrating an apparatus for performing spectral analysis in accordance with exemplary embodiments of the present invention.

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

A tunable laser absorption spectrometer system incorporates a number of key elements configured to produce an output optical spectrum used for quantification of an analyte. An exemplary embodiment of a TLAS system includes a laser driver and tunable laser, which may include, but is not limited to including, a diode laser (e.g. for short-wave infrared applications), quantum/interband cascade lasers (e.g. for mid- to long-wave infrared application), gas lasers, and/or any manifestation of a solid-state laser system. The output of the tunable laser system is split into two beam paths, with configurable split ratio depending on the specific use-case, with the two beams passing through a "sample" path (consisting of the unknown analyte concentration to be quantified) and a "reference" path, consisting of a known concentration of the aforementioned analyte (or relevant simulant molecule). The laser driver controls the laser sweep bias and range, which allowed the laser wavelength to sweep over the atomic/molecular transition for TLAS measurements.

However, it is a priori unknown what the laser wavelength and range is immediately upon TLAS system startup, hence the "reference" path is intended as a laser wavelength/frequency calibration path, whereupon the reference spectral feature from the known reference analyte/simulant may be used to determine the center wavelength of the TLAS system, and the spectral range of the TLAS sweep. During this self-wavelength calibration process, a "feed-forward" algorithm is utilized in three main steps for analyte concentration retrieval:

(1) a regression model (spectral fit) is applied to the reference spectral signal, which returns the reference center and width used as an effective wavelength/frequency "ruler" to determine the center bias and tuning range of the TLAS system (i.e. self-calibration procedure);

(2) the known laser center and tuning range parameters are applied to the sample path (i.e. feed-forward spectral fitting procedure), which contains the sample analyte to be quantified;

(3) spectral fitting to retrieve the unknown sample analyte concentration in real-time.

The three steps are iteratively repeated to retrieve a calibrated analyte spectrum and corresponding sample analyte concentration upon spectral fitting to the calibrated spectrum.

During the process of the above feed-forward spectral analysis procedure, the TLAS system may experience a variety of higher-order (i.e. less significant) limitations, including, but not hunted to (A) laser ramping nonlinearity, whereupon the laser wavelength sweep range is not linearly covered with respect to sweep time, and (B) detection system offsets, due to dark-noise (i.e. thermal noise) of the photodetection system and miscellaneous electronic offsets resulting from the acquisition electronics. The limitations (A) and (B) are most relevant to the generalized and novel TLAS acquisition architecture described in this disclosure and will be described in detail in the following sections. In addition to the aforementioned limitations, there will typically exist Fabry-Perot etalons, resulting from intermediate partially reflecting points in the beam path that manifest as oscillating spectral artefacts which reduce the resulting analyte quantification accuracy. This results in an effective reduction of analyte concentration retrieval accuracy, but ma be numerically and/or empirically mitigated. For example, time-varying etalons may be corrected using an adaptive etalon correction model, including, but not limited to: simple background subtraction for static etalon removal; a dynamic etalon fitting-routine for real-time etalon mitigation; a fourier-domain etalon correction model for complex optical fringes. More simple/complex algorithms may be applied accordingly for the mitigation of such optical fringes. Empirically, etalons may be mitigated through appropriate physical system design; for example, in the case of waveguide sensors on an integrated photonic chip, reduction of line-edge roughness by lithographic process optimization may reduce the randomized scattering points along a waveguide. In the case of a free-space optical system, anti-reflective coatings and back-reflection reduction through optical orientation may be implemented to avoid unwanted fringes. For fiber-based systems, low-loss splicing and larger bend radii may prevent unintentional formation of intermediate cavities.

The above limitations (A) and (B) must be corrected to ensure the feed-forward spectral calibration procedure is effectively implemented. Further limitations exist (apart from Fabry-Perot etalons mentioned above), although these are even less significant and require minor modifications to the main calibration procedure. Details of the feed-forward calibration procedure and addressing higher-order (A) to (B) will be described herein. In brief, (A) may be addressed via an in-line (or optionally parallel) optical etalon scheme, which enables full spectral linearization by observing the consistency of etalon spectral periodicity, which may be subsequently corrected numerically or through laser driver feedback. (B) may be corrected using a simple detection background check prior to each ramp, to ensure a baseline measurement prior to each spectral fit. This ensures baseline detection artefacts are corrected in real-time.

The application of feed-forward spectral calibration procedure (1) to (3) in conjunction with higher-order spectral corrections (A) and (B), enable a fully self-calibrated TLAS procedure to ensure accuracy of the retrieved sample analyte concentration.

Exemplary embodiments of the present invention utilize on-chip spectroscopic sensors to perform tunable laser absorption spectroscopy (TLAS). Alternative embodiments include free-space and/or fiber-based TLAS systems, and our feed-forward calibration methodology is fully generalizable to such alternate embodiments. As discussed above, such techniques may be prone to various limitations such as poor spectral calibration, laser scan nonlinearity, and detection offsets. To mitigate these limitations, exemplary embodiments of the present invention utilize a novel architecture for adaptable acquisition that may be used for arbitrary line-scanned tunable laser spectroscopy (TLAS). In particular, a novel feed-forward spectral calibration procedure is used to allow for calibration of the laser scan center-bias and ramp-range, which provides spectral fitting parameters that enable accurate determination of the unknown analyte concentration. This highly generalized architecture may mitigate or resolve the aforementioned limitations by performing a novel spectral calibration, by performing a novel frequency-scale calibration, and by performing novel laser ramping, each of which is described in detail below.

System Overview

As discussed above, exemplary embodiments of the present invention utilize on-chip spectroscopic sensors to perform tunable laser absorption spectroscopy (TLAS). FIG. 1 is a schematic diagram illustrating an on-chip spectroscopic sensor apparatus 101 in accordance with exemplary embodiments of the present disclosure. The components of this sensor apparatus 101 include a laser driver and tunable laser 102. This unit includes a laser driver for providing a desired driving signal and a tunable diode laser for receiving the driving signal and producing a desired laser light of desired wavelength therefrom. The laser driver may be configured to produce a desired laser driving signal to tune the diode laser to produce a specific frequency of light, which may be changed over time to deliver laser light across a desired spectrum. The laser light so-produced may proceed along a system of silicon, fiber, or free-space laser waveguides that may include a beam splitter 103. The beam splitter 103 may divide the laser light into a sample path and a reference path, and optionally more optical paths for measurement and/or calibration. In this exemplary embodiment, the reference path may implement feed-forward analyte concentration retrieval by extracting the line-shape fitting parameters from a strong reference signal, which is utilized in the concentration extraction of the sample gas in the sample chamber 105 as measured on the second optical detector 108.

The reference path may be used to establish, in general, how the particular spectroscopic sensor apparatus 101 performs, given current environmental conditions (i.e. under a given pressure, temperature condition), in response to a known gas, as each individual spectroscopic sensor apparatus may perform differently even under identical conditions. The reference path may include a reference chamber 104, which may be a capsule containing a known amount of the reference gas. The reference chamber 104 may optionally guide the laser light along a circuitous path so as to increase the distance along which the laser light may interact with the reference gas, thereby increasing the reference signal strength for accurate fitting parameter extraction As an optional component, the reference path may include an in-line frequency reference 106. This element may introduce Fabry-Perot etalons (i.e. optical fringes), or an otherwise periodically oscillating spectrum of known characteristics which may be used as a 'frequency ruler' to determine the linearity and range of the laser scan. This frequency reference element may include an optical element with partially reflecting surfaces (i.e. optical cavity) to generate a periodically varying Airy distribution, or may be an interferometric scheme involving Mach-Zehnder interferometers with unbalanced arm lengths. Any other scheme involving either reflectometric or interferometric schemes to generate consistent and periodic oscillating spectral features are acceptable.

In this exemplary embodiment with a parallel frequency reference element 106, care must be taken with the spectral periodicity of the etalons/fringes such that spectral crosstalk does not contaminate the reference spectrum. Crosstalk contamination avoidance may be ensured by using etalons of appropriate physical length, such that the frequency contributions of the frequency reference element 106 and the reference spectrum from 104 are spectrally independent in the Fourier domain.

The frequency reference element 106 may alternatively be omitted, and in such a case, etalons or fringes that are intrinsic to the silicon waveguides (in the case of an integrated on-chip sensor), and/or other aspects of the apparatus, may be used to introduce the known oscillating frequency spectrum. In an alternate embodiment, the frequency reference element 106 may be placed in an optical path parallel to the sample and reference, which would be measured on a third optical detector and concurrently analyzed along with the first and second optical detector on the acquisition card 109. In this alternate embodiment, any periodically oscillating reference element 106 may be utilized without constraint on spectral crosstalk avoidance.

Regardless of whether the reference frequency element 106 is used, the reference path may include a first optical detector 107. The first optical detector 107 is configured to collect light passing via atoms of the reference gas that were excited by collisions with photons of the laser light. The resulting signal is fractionally reduced due to absorption of the laser light when the laser frequency (i.e. wavelength) is on resonance. By sweeping the laser frequency across a resonance feature, and spectral line-shape of varying fractional absorption is generated. This absorption line-shape is typically described by a Voigt profile (convolution between Gaussian and Lorentzian profiles), although alternate line-shapes may be utilized under varying conditions to provide the closest matching fit to experimental data. Examples of such line-shapes include, but are not limited to: Voigt, Gaussian, Lorentzian, Rautian, and Galatry profiles. The first optical detector 107 generates a signal based on the collected light and sends this signal to an acquisition card 109. The acquisition card 109 may be used to sample the signal of the optical detector 107 at desired intervals and digitize the results, typically sampling via analog-to-digital conversion. A spectral analyzer 110 may then be used to receive the digitized results of the acquisition card 109. The spectral analyzer 110 depicted in this embodiment is a generalized term involving a device which received the digitized spectral measurement and performs a regression routine (i.e. least-mean squares fit) to the appropriate line-shape profile, which yields a concentration value for the sample analyte. It is within the spectral analyzer 110 that spectral analysis via feed-forward spectral fitting occurs, whereupon parameters from the reference line-shape extracted from 104 are utilized to determine the concentration of the unknown analyte in the sample chamber 105.

Because the spectral characteristics of the reference path are known through either a priori simulations or tabulated databases, the least-mean squares (LMS) fitting parameters may be extracted from the fitting results of the spectral analyzer 110 for the reference path and these parameters may be used to interpret the results of the spectral analyzer 110 for the sample path in a feed-forward fashion, as will be described in detail below. These fitting parameters are values that can be used to transform the observed spectral data into the analyte concentration. Thus, in determining the values of the LMS fitting parameters required to transform the observed spectral measurements of the reference path into the expected concentration result of the reference path, the resulting fitting parameter values may then be used to interpret the observed spectral measurement results from the sample path so as to accurately ascertain the concentration value of the unknown quantity of analyte. It is to be noted that the reference path and the sample path may be read substantially simultaneously, and in this way, the parameters determined from the reference path may be used to correct the sample path readings in real-time.

The sample path may include a sample chamber 105. The sample chamber may also include waveguide so as to guide the laser light in a circuitous path therethrough, however, the sample chamber 105, unlike the reference chamber 104, may be opened to the ambient environment so as to test ambient gas. A second optical detector 108 may be used to collect light from the sample chamber 105, however, in other embodiments, a single optical detector may be used to collect light from both the reference chamber 104 and the sample chamber 105, as well as optionally the frequency reference element 106.

The second optical detector 108, where it is used, may also be connected to the acquisition card 109 for sampling and digitization. The Spectral analyzer 110 may similarly interpret the readings of the sample path and may use the parameters extracted from the reference path to determine a chemical composition of the reference gas in a feed-forward fashion, which may include an indication of which elements are present within the gas and at what concentrations they are present.

Feed-Forward Spectral Calibration Routine

Spectral fitting is the process by which the spectral measurement results of the optical detector of the reference path are mapped to a concentration value, which is the parameter of interest in determining the chemical composition of the measured analyte. However, it is a priori unknown what the laser tuning characteristics are during a TLAS measurement if not calibrated beforehand, and in the case of very low sample analyte concentrations (e.g. below the detection limit of the TLAS system), then it is not possible to determine where the TLAS system should be biased, and how large the tuning range should be, since there is no signature to calibrate the TLAS system with. Furthermore, optical etalon drifts and laser drifts may distort the spectral results of the optical detector of the optical path, rendering spectral fitting difficult. Accordingly, spectral calibration is the process by which a very strong reference signal (i.e. one that dominates other spectral noise features) using a known large concentration of reference analyte is introduced for the purpose of determining the TLAS characteristics, such that one may ensure the system is appropriately measuring the transition of interest.

In performing the LMS spectral fitting (typically a non-linear regression routine to a Voigt profile, although a Gaussian, Lorentzian, Galatry, Rautian, or other selected profiles may be utilized depending on the atmospheric conditions under which the measurement takes place), the primary parameters of interest involve (i) the line-center, and (ii) the wavelength scaling parameter. This can be intuitively understood as described below.

The raw spectral measurement is acquired via a tunable laser, which is ramped across the line-shape of interest. This ramping occurs temporally; i.e. a certain laser frequency range $\Delta v$ is scanned for a given unit of time $\Delta t$. Furthermore, as this spectrum is acquired in time-domain, the line-center occurs at a certain time $t_c$ during the ramp process, which corresponds to the expected line-shape center at frequency $v_c$. During the LMS fitting process, a line-shape of known $v_c$ and line-width $\Delta v$ is utilized in the regression model, hence a mapping from $t_c \rightarrow v_c$ and $\Delta t \rightarrow \Delta v$ is produced. This two-parameter mapping required two free-parameters, while the third is reserved for the analyte concentration value $C_A$, which corresponds to the fractional intensity depth $\Delta I$ of the spectral feature, where a given concentration may be mapped to a specific intensity depth through the absorption coefficient $\alpha$, which is a known function of analyte absorption cross-section, path length, particle number density, and environmental factors such as pressure and temperature. Mathematically, we have the following mapping:

$$\Delta v = \Delta t \cdot \zeta_w$$

$$v_c = t_c \cdot \zeta_w + \zeta_c$$

$$\Delta I = \alpha \cdot C_A$$

Based on the mapping above, three key LMS fitting parameters, namely $\zeta_w$, $\zeta_c$, and $C_A$, are used in a simple Voigt-based fitting model, where the first two relate to the spectral line-shape, and the latter is the retrieved concentration of interest. It is in the above context that we may understand a feed-forward spectral fitting model for accurate analyte retrieval: The initial line-shape fitting parameters $\zeta_w$ and $\zeta_c$ are retrieved using the strong signal in the reference gas chamber 104, which are then utilized in the extraction of the analyte concentration $C_A$ by feeding in the (now known) line-shape parameters. This ensures that in the event of spectral contamination of sample analyte spectrum, or in the case where the laser tuning characteristics are changed, or in the case very weak sample analyte spectral signals, the accuracy of the line-shape parameters may be maintained using the aforementioned strong reference signal. Given the concurrent acquisition of sample and reference signal from the concurrent optical paths, this process may be iteratively repeated in real-time to ensure the line-shape parameters are fully up-to-date.

We further note that on an intuitive level, we may understand the retrieval of the fitting parameters $\zeta_w$ and $\zeta_c$ as the equivalent of a 'frequency ruler' whereby the line-width parameter provides a length scaling, and the latter line-center parameter provides an absolute value to the frequency axis.

Figure 2A:
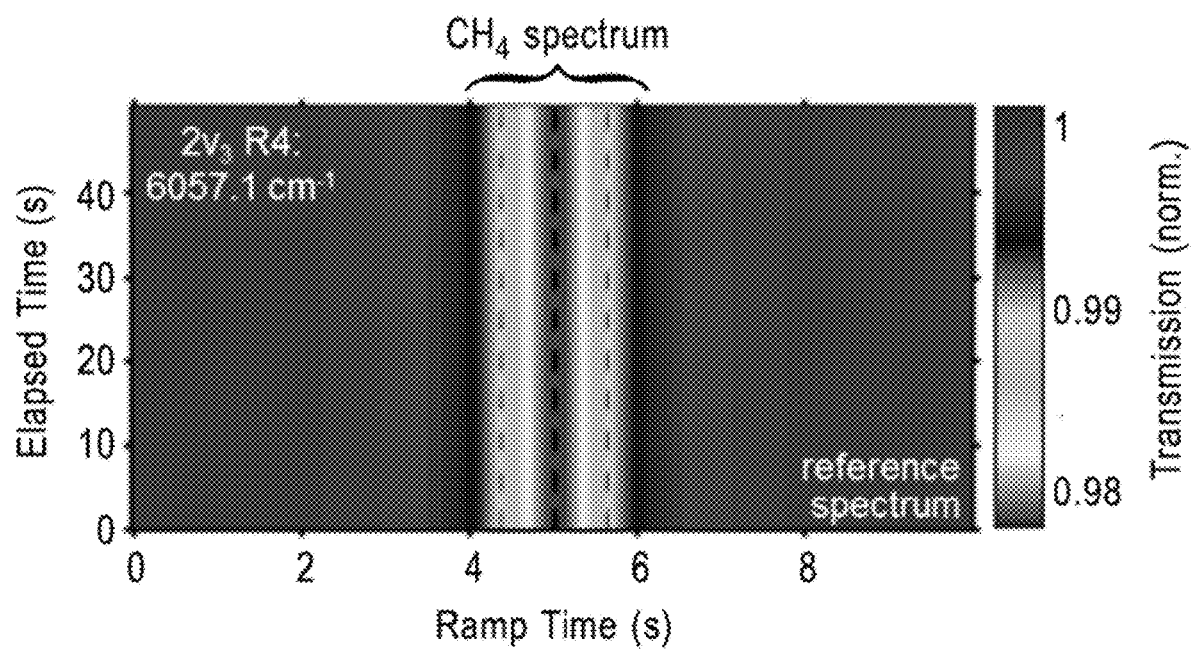
FIG. 2A and FIG. 2B show images representing spectral analysis of a reference signal and a sample signal, respectively, in accordance with exemplary embodiments of the present invention.
Figure 2B:
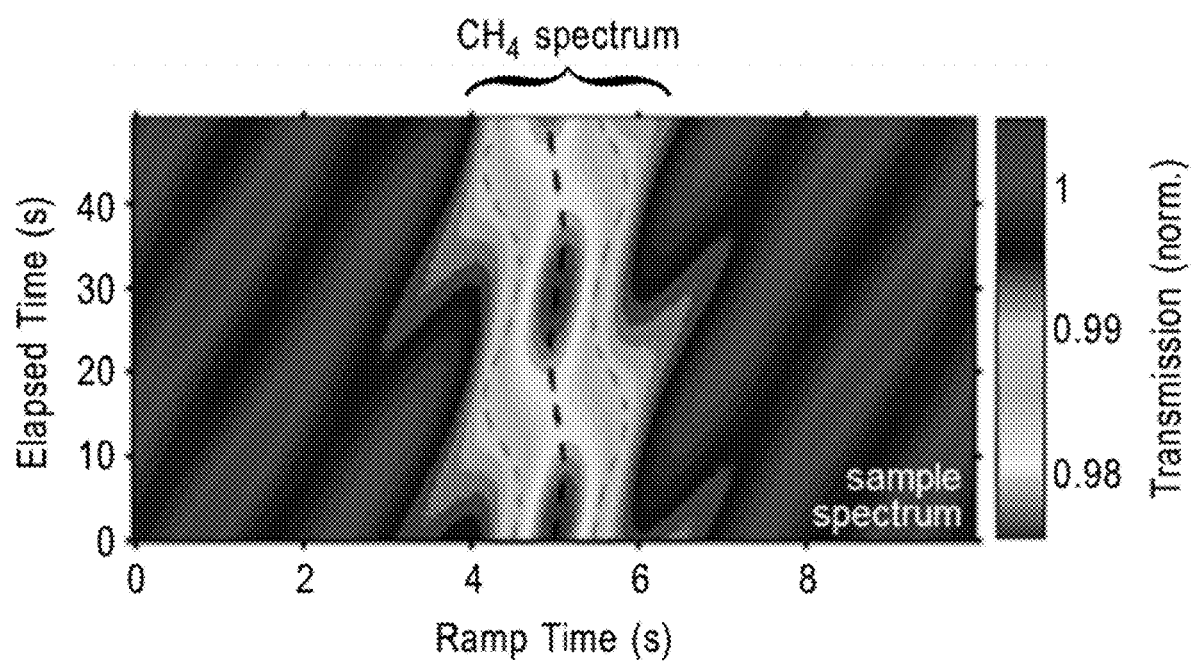

To pictorially illustrate the benefits of using such a strong reference signal, as opposed to a weak and/or contaminated sample analyte spectral signal, FIG. 2A is a diagram illustrating a reference signal spectral cascade and FIG. 2B is a diagram illustrating a sample signal spectral cascade in accordance with exemplary embodiments of the present disclosure. The aforementioned diagrams show a series of spectra measured over a 50 s time-interval, where each spectrum (horizontal) is cascaded vertically. As can be seen from the first diagram FIG. 2A, there is a clearly defined spectrum that is characteristic of methane gas ($CH_4$). This is indicative of the measurement that may be acquired in the presence of a strong reference spectral signal (i.e. large concentration of $CH_4$). The extracted spectral line-width and line-center are constant over time, as expected in the limit of large signal-to-noise ratio and stable laser ramping. In contrast, the second diagram FIG. 2B has a distorted arrangement in which the extracted line-width and line-center change over time, in response to spectral noise, which in this case are time-varying Fabry-Perot etalons. The improvement in the case of a clean spectrum is notable in terms of consistency of parameter retrieval and indicates the necessity of having a dedicated reference spectrum with a strong signal-to-noise ratio to ensure accurate retrieval of line-shape fitting parameters.

Figure 3:
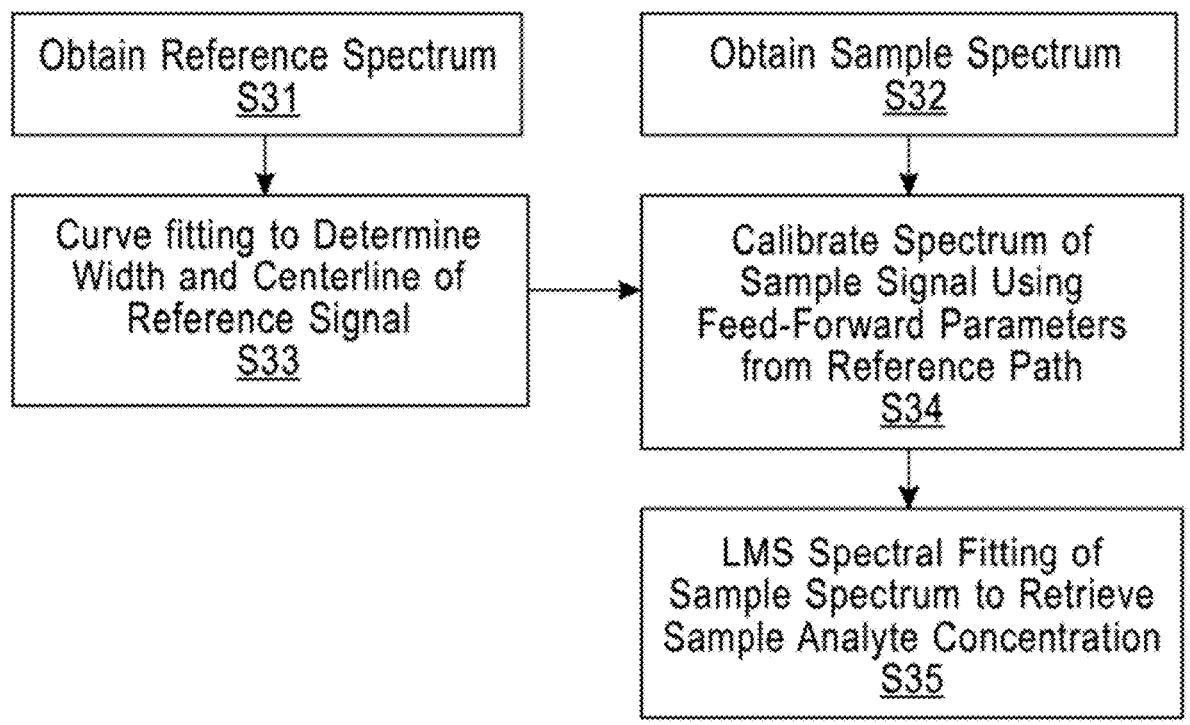
FIG. 3 is a flow chart illustrating a method for performing LMS spectral fitting in accordance with exemplary embodiments of the present invention.

FIG. 3 is a flow chart illustrating an approach for feed-forward spectral calibration in accordance with exemplary embodiments of the present invention. According to this approach, a feed-forward line-by-line spectral retrieval as described previously is used to extract the line-shape parameters such that the effects of etalon drift and/or laser ramp range variations do not impact the accuracy of the retrieved analyte concentration.

According to this approach, the reference signal is obtained (Step S31), as provided above. The reference path spectral measurement (e.g. reference signal) is obtained and analyzed in real-time, concurrent to the sample spectral measurement (Step S32) as measured through the sample optical path. In this analysis, the aforementioned LMS spectral fitting routine may be used to determine a line-width and line-center of the reference signal (Step S33). As detailed above, this strong spectral signal provides an accurate measure of the line-shape parameters in the presence of fluctuating (i.e. unstable laser scan bias and range). The quality of the LMS spectral fit to the reference gas may be confirmed by comparison of the retrieved reference concentration with respect to the expected (i.e. known) concentration. Ideally, the identical gas of interest as the analyte probed in the sample path will be used in the reference cell, and therefore the extracted line-width and line-center of the reference line-shape ma be applied to the sample chamber gas. Deviations from the expected reference concentration may be attributed to higher-order corrections (including, but not limited to ramping nonlinearities, detection baseline artefacts, etc.), which are detailed and resolved in the following section.

This characterization of the LMS spectral fitting free-parameters $\zeta_w$ and $\zeta_c$ corresponding to the line-width and line-center respectively (Step S33) may then be fed-forward it use in accurately ascertaining the sample analyte concentration $C_A$ (Step S34). More specifically, the line-width and line-center parameters are fixed in the case of the sample spectrum analysis, based on the values determined from the reference spectral analysis. This process is iteratively performed in real-time such that any laser ramp bias or range fluctuations are accurately accounted for during the sample analysis process (Step S35).

The feed-forward process outlined above is high generalizable to any TLAS system incorporating both a sample and reference path, where the reference gas is a known high concentration with excellent signal-to-noise ratio. Such TLAS systems include, but are not limited to: free-space optical systems, fiber-based sensing systems, and on-chip photonic chip sensors. Furthermore, the method is generalizable to all wavelength ranges applicable on such systems, ranging from short-wave infrared to mid- and long-wave infrared TLAS systems. Principal higher-order limitations of this generalizable feed-forward procedure are (i) TLAS laser ramping non-linearities, and (ii) time-varying detection system offsets. The resolutions to these limitations are described below.

Frequency-Scale Calibration in the Presence of Laser Ramp Non-Linearities

As discussed above, the presence of TLAS laser ramping non-linearities may cause accuracy deviations in the feed-forward procedure outlined above and in FIGS. 2A and 2B. This may be understood by the distortion of the measured reference and sample line-shape if the laser scan is not perfectly linear in frequency. Given that our LMS fitting routine may not adequately account for non-linear line-shape distortions, these issues may be corrected prior to spectral analysis.

The method for such correction is demonstrated in the exemplary embodiment shown in FIG. 1. The reference path may utilize an in-line frequency reference element 106 to introduce a periodically oscillating spectral signature that may be used to linearize the measured spectrum (both reference and sample) prior to spectral analysis (i.e. LMS fitting and concentration retrieval). The mechanism for such correction is to simply identify the spacing of the periodically oscillating spectral features and ensure that they are evenly distributed post-correction. In alternate embodiments of the present invention, this frequency scale calibration may be also performed using an additional concurrent optical path consisting of only a frequency reference element, and a third optical detector may be introduced to acquire the reference frequency element spectrum. In another embodiment, the TLAS system may be designed without the use of in-line frequency reference elements by utilizing the intrinsic etalons of the sensor apparatus. This is particularly pertinent in the case of an integrated photonic TLAS sensor utilizing long-waveguides as its sensing element, as the random back-reflections from this long-waveguide will typically generate a variety of Fabry-Perot etalons which may be used for linearization of the measured reference/sample spectrum.

Even in the case where there exists significant etalon drift due to environmental (e.g. temperature) fluctuations, the aforementioned intrinsic etalons should be selected such that a great enough number of etalon periods are present within the scan range to avoid any detrimental effect on the frequency scale linearization. Thus, the procedure described above may be effectively performed even in the absence of the in-line frequency reference elements.

However, it is to be noted that the effect of some intrinsic etalons might be more difficult to isolate than others. For example, if intrinsic etalons have a relatively short frequency period, the aforementioned parameter extraction may be simplified as there would be an adequate differentiation between the frequency effects of the reference/analyte gas and the frequency effects of the intrinsic etalons. However, if the intrinsic etalons have a relatively long frequency period, or period on the similar order as the Fourier components of the spectral line-shape, there may be crosstalk between the intrinsic etalons and the reference/analyte gas, which may make parameter extraction more difficult and may reduce the operational accuracy of the instant approach. In such a case it is advisable to utilize the exemplary embodiment in FIGS. 2A and 2B to avoid such etalon cross-talk, or utilize a third optical path consisting of solely a frequency reference element.

Laser Ramping Optimization for Accuracy Enhancement

As discussed above, a second higher-order accuracy limitations arises in the form of time-varying detection offset, whereupon the detection system suffers from various noise limitations, principally "dark noise," or "thermal noise." This manifests as a baseline dependence upon the ambient temperature, which excites carriers to their upper-energy level even in the absence of incident optical signal of interest.

Figure 4A:
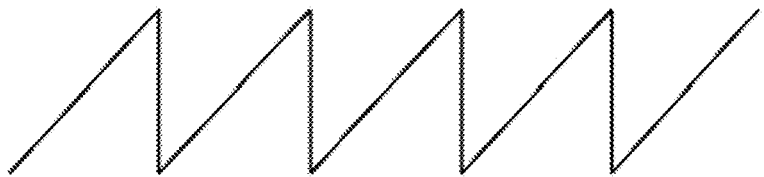
FIG. 4A and FIG. 4B show diagrams of configurable TLAS ramping schemes in accordance with exemplary embodiments of the present invention.
Figure 4B:
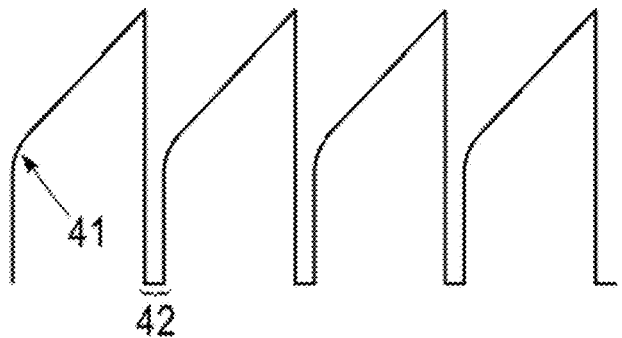

FIG. 4A includes a first laser ramping signal in which there is a hard transition and no offset. FIG. 4B includes a second laser ramping signal in which there is a soft transition and an offset, in accordance with exemplary embodiments of the present invention.

In a nominal TLAS ramp case, as indicated in FIG. 4A, a sawtooth ramp waveform is utilized to periodically scan over the target transition. Such a sawtooth waveform suffers from the above limitation of detection offset drift, which manifests as an inaccurate fractional absorption reading of the spectral signature since the true-baseline is not measured.

This is remedied in the modified waveform shown in FIG. 4B, whereupon a detection offset measurement (i.e. zero-signal baseline) 42 is inserted in between the sawtooth waveform periods to ensure the zero signal baseline, or detection system offset is measured prior to each spectral acquisition. Given the typical ramp rates of >100 Hz, this ensures that the periodic detection offset measurement is effectively real-time for all practical purposes.

As discussed above, the laser driver is used to drive the tunable laser across a desired frequency spectrum. Ideally, the laser should be driven to produce light of a specific frequency for a specific period of time before jumping to produce light of the next frequency for the specific period of time. In this way, the laser would ideally be able to jump cleanly from one frequency to another or to cleanly change frequencies at a steady pace. However, in practice, the tunable laser may have various ramping non-linearities, as described in the prior section and so the transition from one frequency to the next might not be smooth.

According to exemplary embodiments of the present invention, the laser driver may be configured to tune the laser using a square wave having a soft transition, with an observable offset between pulses, so as to minimize laser non-linearities and to use the offset between pulses to recognize a baseline frequency so that the results may be offset accordingly.

Such a scheme enables the laser ramping non-linearities to be mitigated substantially, and is an additional mitigation technique for the prior section addressing frequency scale calibration in the presence of non-linear laser ramping.

As can be seen from the first laser ramping signal in FIG. 4A, the laser is repeatedly ramped in a sawtooth waveform. However, as laser ramping non-linearities may occur, exemplary embodiments of the present invention may utilize a second laser ramping signal in FIG. 4B in which there is a soft (e.g. curved) transition at the start of each pulse and an offset 42 between each pulse. The soft transition may reduce laser ramp non-linearities by softening the transition between the pulse being off and on, and the offset may be used to measure a baseline of the laser (e.g. to measure the laser output when the laser is expected to be at zero) such that the (potentially) time-varying laser offset may be compensated for.

Combined Execution for Feed-Forward TLAS Analysis

Exemplary embodiments of the present invention may accordingly include an on-chip spectroscopic sensor platform, free-space optical platform, or fiber-based sensing platform to perform TLAS in which spectral calibration is performed using feed-forward line-by-line spectral retrieval, in which frequency-scale calibration is performed using an in-line frequency reference element (or alternatively intrinsic etalons or a third concurrent optical path consisting of a frequency reference element), and m which laser ramping is performed using a driving signal with soft transitions and detection offset measurements such that accurate line-scanned absorption spectroscopy may be performed.

Figure 5:
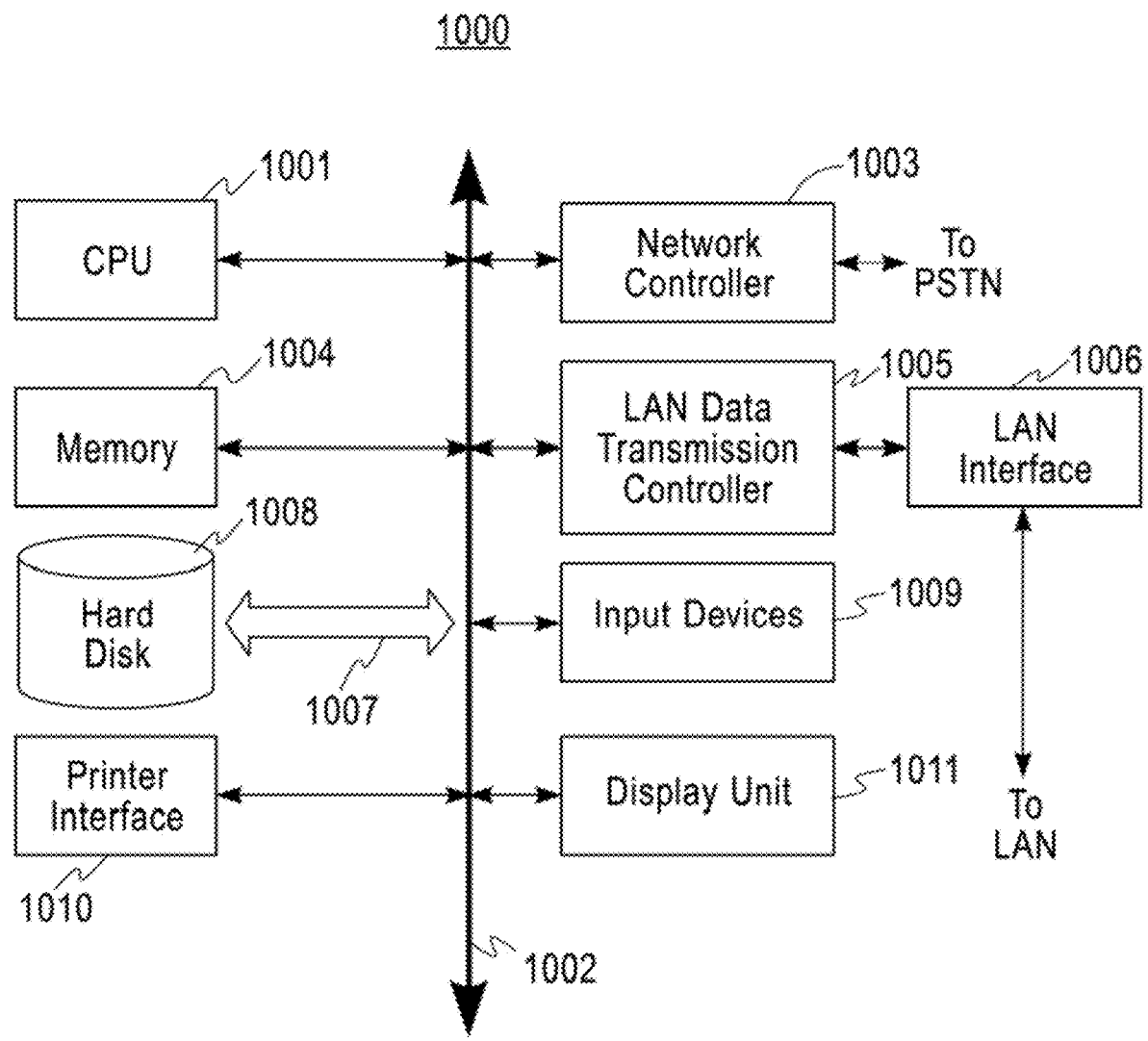
FIG. 5 shows an example of a computer system capable of implementing the method and apparatus according to embodiments of the present disclosure.

FIG. 5 shows the computational system for spectral analysis in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer-devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 6, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to FIGS. 1-4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A generalized feed-forward method for accurate tunable laser absorption spectroscopy, comprising:
   generating a laser beam,
   directing, the generated laser beam down a reference path and a test/sample path:
   extracting two spectral line shape parameters $\zeta_W$ and $\zeta_C$ from the reference path; and
   using the two spectral line shape parameters $\zeta_W$ and $\zeta_C$ extracted from the reference path, as feed-forward, and one analyte concentration parameter $C_A$ concurrently extracted from the test/sample path to iterate a Voigt-based fitting model and direct a composition and/or concentration of an analyte gas within the test/sample path, using the Voigt-based fitting model that has been integrated using $\zeta_w$, $\zeta_c$ and $C_A$ as key least-mean squares LMS fitting parameters,
   wherein the extraction of the two spectral line shape parameters $\zeta_W$ and $\zeta_C$ from the reference path and the extraction of the analyte concentration parameter $C_A$ from the test/sample path are performed concurrently.

2. The method of claim 1, wherein the two spectral fine shape parameters $\zeta_W$ and $\zeta_C$ include line-width and line-center.

3. The method of claim 1, wherein the extraction of the two spectral line shape parameters $\zeta_W$ and $\zeta_C$ from the test sample path and the extraction of the analyte concentration parameter $C_A$ from the test/sample path are performed a plurality of times to repeatedly iterate the Voigt-based fitting model.

4. The method of claim 1, wherein iterating the Voight-based fitting model includes correcting for laser ramp bias and/or correcting for range fluctuations.

5. The method of claim 1, wherein the method is performed in a free-space optical system, a fiber-based sensing system, and/or an on-chip photonic chip sensor.

6. The method of claim 1, wherein the generated laser beam is ramped using a laser ramping signal that has a soft transition at a start of each pulse and an offset between periods.

7. The method of claim 6, wherein the laser ramping signal is a sawtooth wave with soft transitions and the offset between periods.

8. A computer program product for generalized feed-forward method for accurate tunable laser absorption spectroscopy, the computer program product comprising a tangible computer readable storage medium having program instructions embodied therewith, the program instructions executable by a computer to cause the computer to:
   generating a laser beam;
   directing the generated laser beam down a reference path and a test/sample path:
   extracting two spectral line shape parameters $\zeta_W$ and $\zeta_C$ from the reference path: and
   using the two spectral line shape parameters $\zeta_W$ and $\zeta_C$, extracted from the reference path, as feed-forward, and one analyte concentration parameter $C_A$ concurrently extracted from the test/sample path to iterate a Voigt-based fitting model and detect a composition and/or concentration of an analyte gas within the test/sample path, using the Voigt-based fitting model that has been integrated using $\zeta_W$, $\zeta_C$, and $C_A$ as key least-mean squares LMS fitting parameters,
   wherein the extraction of the two spectral line shape parameters $\zeta_W$ and $\zeta_C$ from the reference path and the extraction of the analyte concentration parameter $C_A$ from the test/sample path are performed concurrently.

9. The computer program product of claim 8, wherein the two spectral line shape parameters $\zeta_W$ and $\zeta_C$ include line-width and line-center.

10. The computer program product of claim 8, wherein iterating the Voigt-based fitting model includes correcting for laser ramp bias and/or correcting for range fluctuations.

11. The computer program product of claim 8, wherein the method is performed in a free-space optical system, a fiber-based sensing system, and/or aft on-chip photonic chip sensor.

12. The computer program product of claim 8, wherein the generated laser beam is ramped using a laser ramping signal that has a soft transition at a start of each pulse and an offset between periods.

13. The computer program product of claim 12, wherein the laser ramping signal is a sawtooth wave with soft transitions and the offset between periods.

14. The computer program product of claim 8, wherein the extraction of the two spectral line shape parameters $\zeta_W$ and $\zeta_C$ from the test/sample path and the extraction of the analyte concentration parameter $C_A$ from the test/sample path are performed a plurality of times to repeatedly iterate the Voigt-based fitting model.

* * * * *